No. 656,068. Patented Aug. 14, 1900.
A. W. WEBB.
NUT LOCK.
(Application filed Jan. 10, 1900.)
(No Model.)
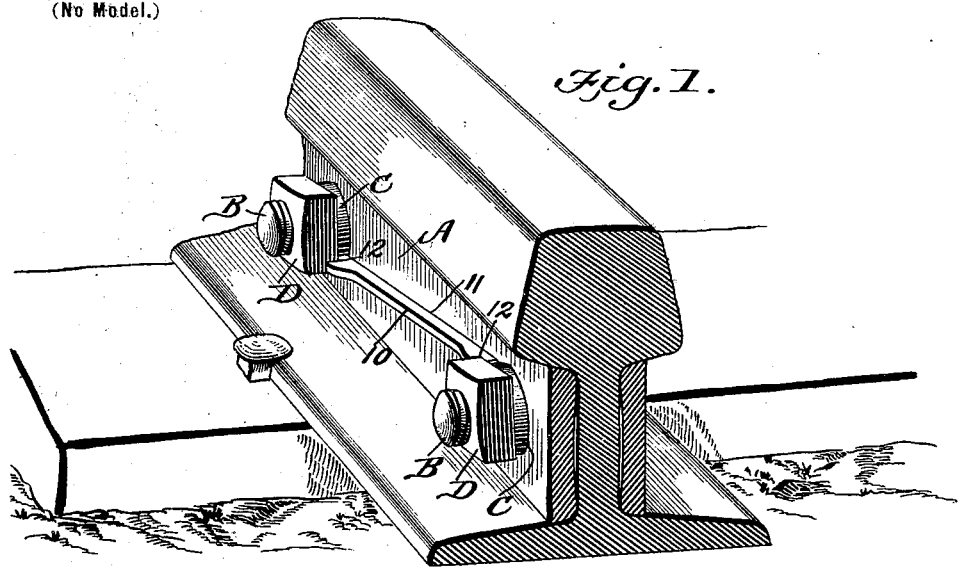
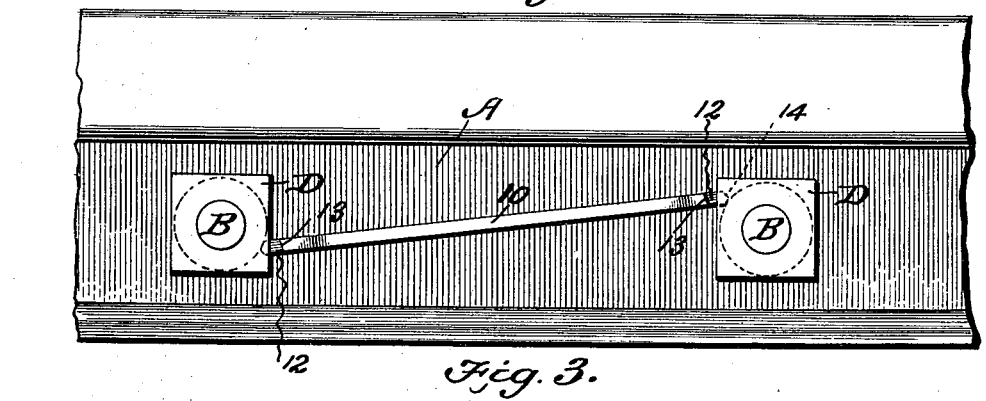
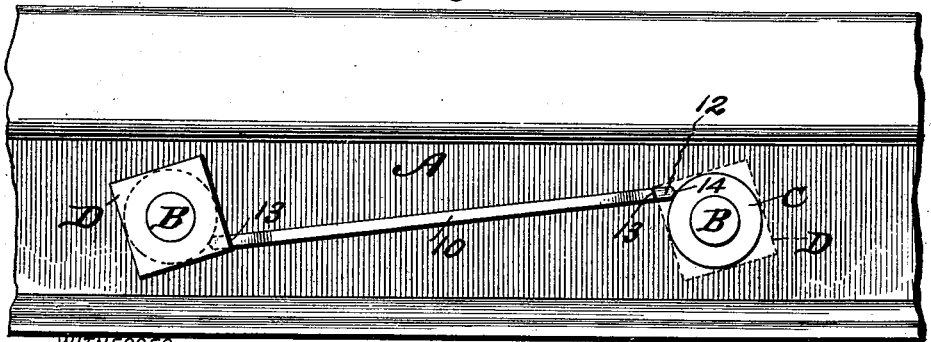
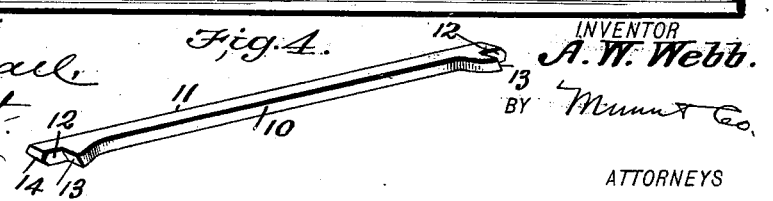
WITNESSES:
INVENTOR
A. W. Webb.
BY
ATTORNEYS

UNITED STATES PATENT OFFICE.

ASA W. WEBB, OF SOUTH UNION, KENTUCKY.

NUT-LOCK.

SPECIFICATION forming part of Letters Patent No. 656,068, dated August 14, 1900.

Application filed January 10, 1900. Serial No. 915. (No model.)

*To all whom it may concern:*

Be it known that I, ASA W. WEBB, of South Union, in the county of Logan and State of Kentucky, have invented a new and useful Improvement in Nut-Locks, of which the following is a specification.

My invention is an improvement in nut-locks, and has for its object a device for preventing the unscrewing of nuts which does not need a nut of special construction, but can be used with any of the ordinary forms of bolts and nuts.

The invention consists in certain details of construction, which I shall hereinafter specifically describe and claim.

Reference is to be had to the accompanying drawings, forming part of this specification, in which like characters of reference indicate corresponding parts in all the views.

Figure 1 is a perspective view of a portion of a railroad-tie with my improved nut-lock in place. Fig. 2 is a side elevation thereof, illustrating the lock-bar in place and the nuts unlocked. Fig. 3 is a similar view with the nuts locked, and Fig. 4 is a perspective view of the lock-bar detached.

Referring to the drawings, A designates a fish-plate, B a screw-threaded bolt, C a washer, and D a nut, all of which may be of ordinary or preferred construction.

Between two adjacent nuts my improved lock is adapted to be placed, as shown in Fig. 1, and it consists of a lock-bar 10, having a flat face 11, adapted to lie against the fish-plate, and angular notches 12 at each end, the rear wall of each notch being beveled, as at 13, and parallel with the opposite corresponding wall of the other notch. The opposite side faces of the lock-bar 10 are also beveled at the ends, as shown at 14. To lock the nuts after they are screwed up tightly, the bar 10 is placed diagonally on the fish-plate A, with its ends lying underneath adjacent nuts and the bevels 14 abutting against the washers, as shown in Fig. 2. One nut is then turned back slightly, so as to bring its side face tightly against the beveled rear walls of the notches, as shown in Fig. 3, when the nuts will be locked and prevented from turning farther backward so long as the lock-bar 10 is in place.

Having thus described my invention, what I claim as new, and desire to secure by Letters Patent, is—

1. A nut-lock for two nuts, comprising a lock-bar having notched ends adapted to engage the inner and side faces of the nuts, the rear walls of the notches being inclined in parallel planes oblique to the length of the bar, whereby a backward turn of the nuts will bind their side faces against such rear walls, as set forth.

2. A nut-lock for two nuts, comprising a lock-bar adapted to lie against the fish-plate or the like and having notched ends arranged to fit against the inner and side faces of the nuts, the rear walls of the notches being inclined or beveled in parallel planes oblique to the length of the bar and the side faces of the bar being also beveled whereby to lie snugly against the washers of the nuts, as set forth.

In testimony whereof I have signed my name to this specification in the presence of two subscribing witnesses.

ASA W. WEBB.

Witnesses:
GEO. W. WILSON,
WALTER A. WILLIAMS.